T. F. GALLAGHER.
CAR FENDER.
APPLICATION FILED MAY 21, 1908.
904,124.
Patented Nov. 17, 1908.
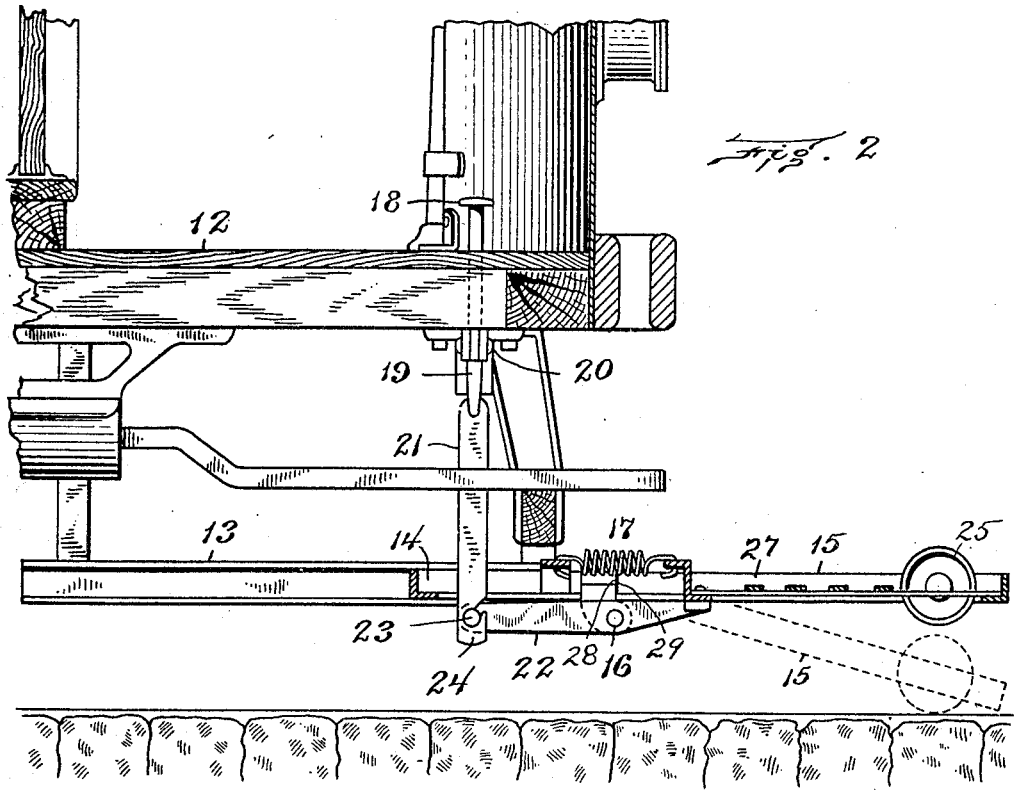
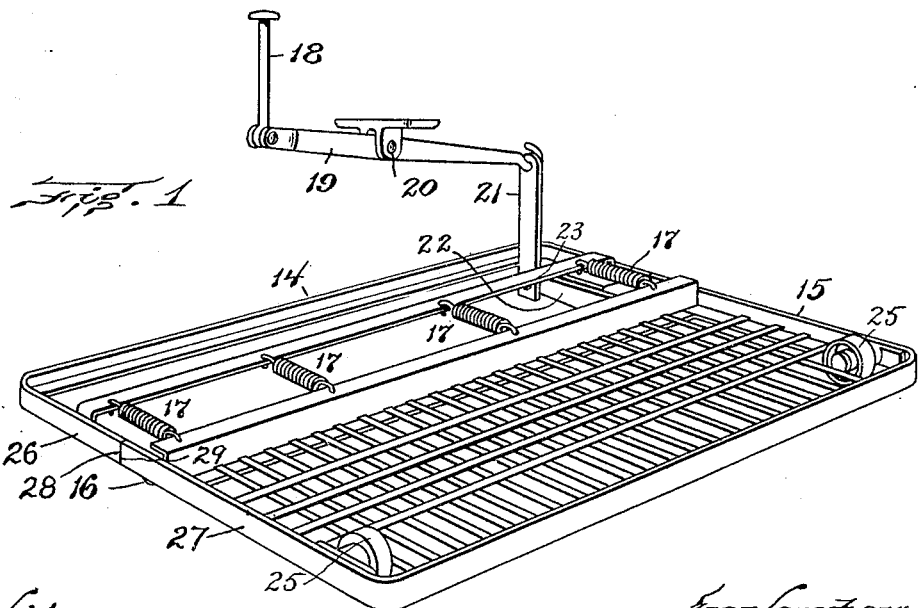
Witnesses:
P. W. Pezzetti
E. Batchelder
Inventor
Thomas F. Gallagher
by Wright Brown Quinby May
Attorneys

UNITED STATES PATENT OFFICE.

THOMAS F. GALLAGHER, OF BOSTON, MASSACHUSETTS.

CAR-FENDER.

No. 904,124.  Specification of Letters Patent.  Patented Nov. 17, 1908.

Application filed May 21, 1908. Serial No. 434,082.

*To all whom it may concern:*

Be it known that I, THOMAS F. GALLAGHER, of Boston, in the county of Suffolk and State of Massachusetts, have invented certain new and useful Improvements in Car-Fenders, of which the following is a specification.

This invention relates to safety appliances for street cars adapted to minimize the liability of serious accident or loss of life in case the car runs down a person on the track.

The invention relates particularly to a fender comprising a flat frame adapted to slide in horizontal longitudinal guides affixed to the car below the platform, the fender being adapted to slide lengthwise of the car in said guides so that it may be projected from under the front platform, and pushed back or retracted when its use is not required.

In practice, two fenders are employed, one at one end, and one at the opposite end of the car, the fender which is at the front end of the car being projected while the fender at the rear end is retracted.

My invention has for its object to provide a fender of this class, the projecting portion of which will be adapted to swing downwardly toward the track either by pressure against it of a body with which it may come in contact, or by mechanism controlled by the motorman of the car, so that the height of the front end of the fender above the track may be quickly reduced to prevent the liability of the fender passing over the body of a person encountered by it.

The invention consists in the improvements which I will now proceed to describe and claim.

Of the accompanying drawings forming a part of this specification, Figure 1 represents a perspective view of a fender embodying my invention detached from the car. Fig. 2 represents a longitudinal section of a portion of a car provided with a fender, and with fender operating mechanism embodying my invention.

The same figures of reference indicate the same parts in all the figures.

In the drawings, 12 represents one of the platform portions of a car body, and 13 represents one of a pair of parallel horizontal guides extending lengthwise of the car under the portion 12, the said guides being adapted to support and permit the forward and backward movement of a flat fender which is adapted to be projected from the front end of the car platform when the fender is in use, and to be retracted wholly under the platform when the fender is not in use.

The fender is composed of a rear section 14, and a forward section 15, such sections collectively forming a rectangular frame, and being connected by hinges 16, whose axial line extends crosswise of the fender, the arrangement being such that the front section 15 is adapted to swing downwardly towards the track as indicated by dotted lines in Fig. 2.

Means are employed for yieldingly supporting the front section in a position substantially flush with the rear section so that the front section can slide backwardly with the rear section in the guides 13 when it is desired to retract or stow away the fender.

The rear section 14 is in continuous engagement with the guides, and when the fender is in use the forward section 15 projects wholly in advance of the guides so that it is free to swing vertically toward and from the track.

The means for yieldingly supporting the forward section in a raised position are, in this embodiment of my invention, a series of helical springs 17, each attached to the rear section 14 at a point behind the axial line of the hinges, and to the forward section 15 at a point in advance of said axial line, the springs extending across the axial line, and their arrangement being such that they normally exert a pull on the forward section tending to hold the same in alinement with the rear section. The forward section is therefore normally held in such position relatively to the rear section that the fender as a whole may be freely moved in the guides 13, the forward section entering the guides when the fender is moved backwardly, and being withdrawn from the guides when the fender is moved forwardly.

It will be seen that when the fender is adjusted for use, its forward end may be swung downwardly by contact with a body on the track, thus reducing the liability of the passage of the fender over said body.

Means are employed whereby the motorman may swing the forward section of the fender downwardly whenever this is necessary, the said means as here shown comprising a foot pedal 18 movable in a guide in the platform 12, a lever 19 pivoted at 20 to the platform and connected at one end with the pedal 18, and a link or rod 21 connecting the opposite end of the lever 19 with an arm 22 affixed to the forward section 15 and extending backwardly therefrom across the axial line of the hinges, said arm being detachably connected with the link 21 by members such as a pin or bolt 23 affixed to the arm 22, and a hook 24 formed on the link 21 and adapted to engage the said pin. When the pedal 18 is depressed, the arm 22 is drawn upwardly, thus depressing the forward end of the fender. The members 23 and 24 above described, may be readily disconnected to permit the backward movement of the fender when its use is not required. The front end of the forward section is provided with wheels 25 adapted to run on the track rails when said section is swung downwardly.

It will be seen that the frame is divided transversely to form the two sections above described, and that the divided ends of the frame constitute sectional runners 26, 27 which are adapted to slide in the guides 13. The sections are provided with reciprocal bearing faces which are preferably the ends 28 and 29 of the said runner sections, said bearing faces being so arranged that when they abut together the runner sections are in alinement with each other, and the forward and rear sections of the fender are flush with each other.

The springs 17 hold the bearing faces of the forward section yieldingly against the bearing faces of the rear section, said bearing faces limiting the upward movement imparted to the forward section by the springs.

I claim:

1. A car fender comprising a frame divided transversely to form a rear section and a forward section hinged to the rear section, the divided ends of the frame constituting sectional runners adapted to slide in guides affixed to the car body, and means for yieldingly maintaining the forward section substantially flush with the rear section and the runner sections in alinement with each other, whereby the frame may be retracted and both sections rigidly supported by said guides, the forward section being adapted to be projected from the guides and to swing downwardly on the hinges which connect the sections.

2. A car fender comprising a frame divided transversely to form a rear section and a forward section hinged to the rear section, the divided ends of the frame constituting sectional runners adapted to slide in guides affixed to the car body, the sections being provided with reciprocal bearing faces which abut together when the runner sections are in alinement with each other, and means for yieldingly holding the bearing faces of the forward section against the bearing faces of the rear section.

3. A car fender comprising a frame divided transversely to form a rear section and a forward section hinged to the rear section, the divided ends of the frame constituting sectional runners adapted to slide in guides affixed to the car body, the sections being provided with reciprocal bearing faces which abut together when the runner sections are in alinement with each other, and springs affixed to the rear section behind the axial line of the hinges which connect the sections, and to the forward section in front of said line, said springs being adapted to hold the bearing faces of the forward section yieldingly against the bearing faces of the rear section and the runner sections in alinement with each other.

4. The combination with a car having parallel longitudinal guides below its body of a fender comprising a frame divided transversely to form a rear section and a forward section hinged to the rear section, the divided ends of the frame constituting sectional runners adapted to slide in said guides, and means for yieldingly maintaining the forward section substantially flush with the rear section and the runner sections in alinement with each other, whereby the fender may be retracted and both sections rigidly supported by said guides, the forward section being adapted to be projected from the guides and to swing downwardly on the hinges which connect the sections.

5. The combination with a car having parallel longitudinal guides below its body of a fender comprising a frame divided transversely to form a rear section and a forward section hinged to the rear section, the divided ends of the frame constituting sectional runners adapted to slide in said guides, and means for yieldingly maintaining the forward section substantially flush with the rear section and the runner sections in alinement with each other, whereby the fender may be retracted and both sections rigidly supported by said guides, the forward section being adapted to be projected from the guides and to swing downwardly on the hinges which connect the sections, and mechanism carried by the car for swinging the forward section downwardly, said mechanism being detachably connected with the forward section to permit the retraction of the fender.

In testimony whereof I have affixed my signature, in presence of two witnesses.

THOMAS F. GALLAGHER.

Witnesses:
JOSEPH H. GALLAGHER,
RICHARD A. ANDREOLI.